(12) United States Patent
Nitta et al.

(10) Patent No.: US 12,164,086 B2
(45) Date of Patent: Dec. 10, 2024

(54) CAMERA LENS

(71) Applicant: AAC Optics (Changzhou) Co., Ltd., Jiangsu (CN)

(72) Inventors: Koji Nitta, Osaka (JP); Takayuki Sakaguchi, Osaka (JP); Hiroyuki Teraoka, Osaka (JP)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 470 days.

(21) Appl. No.: 17/563,039

(22) Filed: Dec. 27, 2021

(65) Prior Publication Data

US 2022/0308316 A1    Sep. 29, 2022

(30) Foreign Application Priority Data

Mar. 24, 2021    (JP) .................... 2021-049472

(51) Int. Cl.
 *G02B 13/00*    (2006.01)
 *G02B 9/62*    (2006.01)
(52) U.S. Cl.
 CPC ........... *G02B 13/0045* (2013.01); *G02B 9/62* (2013.01)
(58) Field of Classification Search
 CPC .............. G02B 13/0045; G02B 9/62; G02B 13/0015

USPC ......................................................... 359/713
See application file for complete search history.

(56) References Cited

U.S. PATENT DOCUMENTS

| | | | | |
|---|---|---|---|---|
| 2018/0188506 A1* | 7/2018 | Chang | ...................... | G02B 9/62 |
| 2020/0150391 A1* | 5/2020 | Hsueh | ...................... | G02B 9/62 |
| 2020/0209541 A1* | 7/2020 | Bian | ................. | G02B 13/0045 |
| 2021/0063701 A1* | 3/2021 | Son | .......................... | G02B 9/62 |
| 2022/0317418 A1* | 10/2022 | Cheng | ............... | G02B 27/0018 |
| 2023/0094454 A1* | 3/2023 | Lin | .......................... | G02B 9/62 |
| | | | | 359/713 |
| 2024/0126046 A1* | 4/2024 | Kwon | ................ | G02B 13/0045 |
| 2024/0310605 A1* | 9/2024 | Jung | ........................ | G02B 3/02 |

* cited by examiner

*Primary Examiner* — Stephone B Allen
*Assistant Examiner* — Boutsikaris Leonidas
(74) *Attorney, Agent, or Firm* — W&G Law Group (57) ABSTRACT

The present invention relates to a field of optical lens, and discloses a camera lens with six-piece lenses including a first lens having a positive refractive power, a second lens having a positive refractive power, a third lens having a negative refractive power, a fourth lens having a negative refractive power, a fifth lens having a positive refractive power, and a sixth lens having a negative refractive power. The camera lens satisfies following conditions: in an imaging status $TTL/LB \leq 2.20$, $7.50 \leq D12/d2 \leq 8.50$, $0.04 \leq d6/f \leq 0.08$, and $-1.00 \leq R6/R7 \leq -0.35$. The present invention has a small height in a retraction status, and a narrow angle as well as good optical properties in the imaging status.

4 Claims, 6 Drawing Sheets

LA1

Imaging status

Image surface

STOP

Retraction status

Imaging status

Image surface

Retraction status

CAMERA LENS

FIELD OF THE PRESENT INVENTION

The present invention relates to a camera lens, and more particularly, to an invention of a camera lens suitable for camera assemblies, digital cameras, or the like for smartphones, which adopt camera elements such as CCDs and CMOS for high pixels. The camera lens in the invention is a camera lens in an imaging status with a narrow angle of 50° or less at full viewing angle (hereinafter referred as 2ω) and having good optical properties, while in a retraction status, the camera lens has a TTL/IH of 1.40 or less, and involves a small height in the retraction status. The camera lens consists of six-piece lenses.

DESCRIPTION OF RELATED ART

As in the camera lens, the TTL (total optical length) becomes longer and the field of view gets narrower, in recent years such a camera lens is needed that: the camera lens could possess a narrow angle and good optical properties in the imaging status, while in the retraction status the lens barrel could be contracted into the camera for obtaining a shorter TTL and a lower height during retraction.

There is a technology development of a camera lens is being promoted, the camera lens consisting of six-piece lenses and including a narrow angle and good optical properties. As a camera lens of a six-piece lenses structure, the camera lens in a related art consists of six-piece lenses, including from an object side to an image side in sequence: a first lens with a positive refractive power, a second lens with a positive refractive power, a third lens with a negative refractive power, a fourth lens with a negative refractive power, a fifth lens with a positive refractive power, and a sixth lens with a negative refractive power.

Although the 2ω of the camera lens the related art is narrowed to 49.4°, the ratio of TTL in the imaging status to LB in the imaging status is still not sufficient, and therefore the height in the retraction status is also not reduced sufficiently.

SUMMARY

In the present invention, a camera lens is provided. The camera lens has a small height in a retraction status, while in an imaging status, the camera lens could have a narrow angle and good optical properties, and the camera lens consists of six-piece lenses.

Inventors of the present invention carefully studied a ratio of TTL (total optical length) to LB (back focus length) in the imaging status, a ratio of an on-axis distance from an object side surface of a first lens to an image side surface of a second lens to an on-axis distance from the image side surface of the first lens to an object side surface of the second lens, a ratio of an on-axis distance from an image side surface of a third lens to an object side surface of a fourth lens to a focal length of the whole camera lens, and a ratio of a central curvature radius of the image side surface of the third lens to a central curvature radius of the object side surface of the fourth lens, and a ratio of a central curvature radius of the image side surface of the third lens to a central curvature radius of the object side surface of the fourth lens, it was found that a camera lens that can resolve the problems of the related art could be obtained, and the present invention is thus acquired.

According to one aspect of the present invention, a camera lens with six-piece lenses comprises, from an object side to an image side in sequence, a first lens having a positive refractive power, a second lens having a positive refractive power, a third lens having a negative refractive power, a fourth lens having a negative refractive power, a fifth lens having a positive refractive power, and a sixth lens having a negative refractive power; and the camera lens satisfies the following conditions: in a imaging status, TTL/LB≤2.20, 7.50≤D12/d2≤8.50, 0.04≤d6/f≤0.08, and −1.00≤R6/R7≤−0.35. TTL denotes an on-axis distance from an object side surface of the first lens to an image surface of the camera lens along an optical axis, LB denotes a back focal length of the camera lens, D12 denotes an on-axis distance from the object side surface of the first lens to an image side surface of the second lens, d2 denotes an on-axis distance from an image side surface of the first lens to an object side surface of the second lens, f denotes a focal length of the camera lens, d6 denotes an on-axis distance from an image side surface of the third lens to an object side surface of the fourth lens, R6 denotes a central curvature radius of the image side surface of the third lens, and R7 denotes a central curvature radius of the object side surface of the fourth lens.

As an improvement, the camera lens further satisfies a following condition: 0.60≤f1/f≤0.80, where f1 denotes a focal length of the first lens.

As an improvement, the camera lens further satisfies a following condition: 0.90≤f2/f≤1.30, where f2 denotes a focal length of the second lens.

As an improvement, the camera lens further satisfies a following condition: −0.70≤f3/f≤−0.50, where f3 denotes a focal length of the third lens.

As an improvement, the camera lens further satisfies a following condition: 0.05≤d8/f≤0.10, where d8 denotes an on-axis distance from an image side surface of the fourth lens to an object side surface of the fifth lens.

Beneficial effects of the present invention are that: according to the present invention, a camera lens is particularly related, which is suitable for camera assemblies, digital cameras, or the like, for smartphones, which adopt camera elements such as CCDs and CMOS for high pixels. The camera lens in the invention, in an imaging status is a camera lens, with a narrow angle 2ω≤50° and having good optical properties, while in a retraction status, TTL/IH≤1.40, and a small height in the retraction status is obtained, and the camera lens consists of six-piece lenses.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative efforts, other drawings can be obtained based on these drawings, among which.

DETAILED DESCRIPTION OF THE EXEMPLARY EMBODIMENTS

The present invention is further illustrated with reference to the accompanying drawings and embodiments. To make the objects, technical solutions, and advantages of the present disclosure clearer, the embodiments of the present invention are described in detail with reference to the accompanying drawings below. A person of ordinary skill in the related art can understand that, in the embodiments of the present disclosure, many technical details are provided to make readers better understand this application. However, even without these technical details and any changes and modifications based on the following embodiments, technical solutions required to be protected by this application can be implemented.

Figure 1:
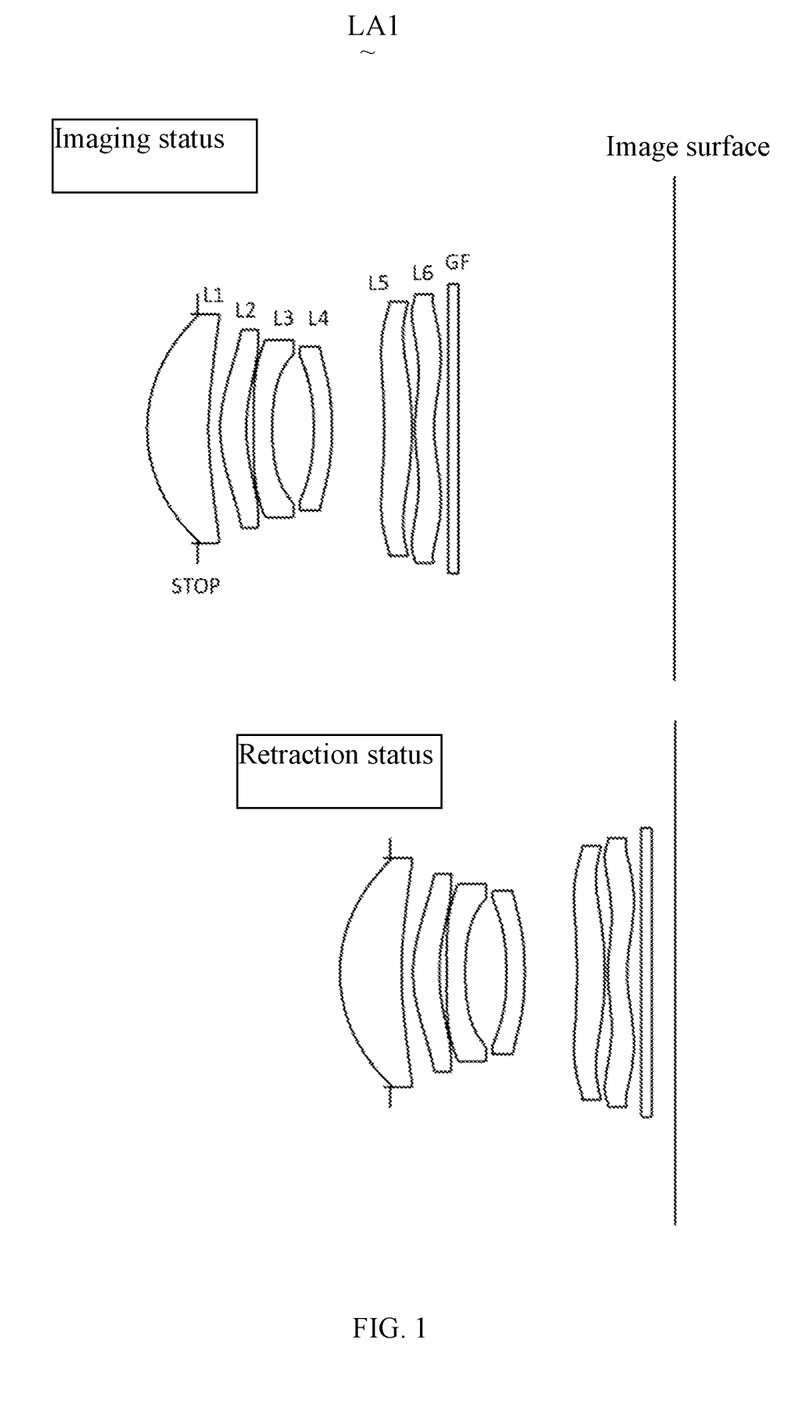
FIG. 1 is a schematic diagram of a general structure of a camera lens in accordance with Embodiment 1 of the present invention.

Embodiments of the camera lens in the present invention are described below. The camera lens LA1 has lens system of a six-piece lenses structure. The six-piece lenses structure, includes from an object side to an image side in sequence, a first lens L1, a second lens L2, a third lens L3, a fourth lens L4, a fifth lens L5, and a sixth lens L6. A glass plate GF is provided between the sixth lens L6 and an image surface. The glass plate GF can be a glass cover plate or an optical filter. In the present invention, the glass plate GF can be provided at different positions, or can be omitted.

The first lens L1 has a positive refractive power, the second lens L2 has a positive refractive power, the third lens L3 has a negative refractive power, the fourth lens L4 has a negative refractive power, the fifth lens L5 has a positive refractive power, and the sixth lens L6 has a negative refractive power. In order to correct various aberrations, it is desirable to design all surfaces of these six-piece lenses as aspherical surfaces.

The camera lens LA1 satisfies a following condition (1):

$$\text{in an imaging status, } TTL/LB \leq 2.20 \quad (1)$$

The condition (1) specifies a ratio of a total optical length (an on-axis distance from an object side surface of the first lens to an image surface of the camera lens along an optical axis) of the camera lens TTL in the imaging status to a back focal length (an on-axis distance from an image side surface S12 of the sixth lens to the image surface) LB in the imaging status. If it is within the range of condition (1), a lowered height in a retraction status can be easily achieved, which is an improvement.

The camera lens LA1 further satisfies a following condition (2):

$$7.50 \leq D12/d2 \leq 8.50 \quad (2)$$

The condition (2) specifies a ratio of an on-axis distance D12 from an object side surface S1 of the first lens L1 to an image side surface S4 of the second lens L2 to an on-axis distance d2 from an image side surface S2 of the first lens L1 to an object side surface S3 of the second lens L2. If it is within the range of condition (2), the lowered height in the retraction status can be easily achieved and correction of various aberrations is easily realized with the narrowing of the field of view in the imaging status, which is an improvement.

The camera lens LA1 further satisfies a following condition (3):

$$0.04 \leq d6/f \leq 0.08 \quad (3)$$

The condition (3) specifies a ratio of an on-axis distance d6 from an image side surface S6 of the third lens L3 to an object side surface S7 of the fourth lens L4 to a focal length f of the whole camera lens LA1. If it is within the range of condition (3), the lowered height in the retraction status can be easily achieved and correction of various aberrations is easily realized with the narrowing of the field of view in the imaging status, which is an improvement.

The camera lens LA1 further satisfies a following condition (4):

$$-1.00 \leq R6/R7 \leq -0.35 \quad (4)$$

The condition (4) specifies a ratio of a central curvature radius R6 of the image side surface S6 of the third lens L6 to a central curvature radius R7 of the object side surface S7 of the fourth lens L4. If it is within the range of condition (4), the lowered height in the retraction status can be easily achieved and correction of various aberrations is easily realized with the narrowing of the field of view in the imaging status, which is an improvement.

The camera lens LA1 further satisfies a following condition (5):

$$0.60 \leq f1/f \leq 0.80 \quad (5)$$

The condition (5) specifies a ratio of a focal length f1 of the first lens L1 to the focal length f of the whole camera lens LA1. If it is within the range of condition (5), the lowered height in the retraction status can be easily achieved and correction of various aberrations is easily realized with the narrowing of the field of view in the imaging status, which is an improvement.

The camera lens LA1 further satisfies a following condition (6):

$$0.90 \leq f2/f \leq 1.30 \quad (6)$$

The condition (6) specifies a ratio of a focal length f2 of the second lens L2 to the focal length f of the whole camera lens LA1. If it is within the range of condition (6), the lowered height in the retraction status can be easily achieved and correction of various aberrations is easily realized with the narrowing of the field of view in the imaging status, which is an improvement.

The camera lens LA1 further satisfies a following condition (7):

$$-0.70 \leq f3/f \leq -0.50 \quad (7)$$

The condition (7) specifies a ratio of a focal length f3 of the third lens L3 to the focal length f of the whole camera lens LA1. If it is within the range of condition (7), the lowered height in the retraction status can be easily achieved and correction of various aberrations is easily realized with the narrowing of the field of view in the imaging status, which is an improvement.

The camera lens LA1 further satisfies a following condition (8):

$$0\ 0.05 \leq d8/f \leq 0.10 \quad (8)$$

The condition (8) specifies a ratio of an on-axis distance d8 from an image side surface S8 of the fourth lens L4 to an object side surface S9 of the fifth lens L5 to the focal length f of the whole camera lens LA1. If it is within the range of condition (8), the lowered height in the retraction status can be easily achieved and correction of various aberrations is easily realized with the narrowing of the field of view in the imaging status, which is an improvement.

The six-piece lenses of the camera lens LA1 satisfy the above construction and conditions, so as to obtain the camera lens consisting of six-piece lenses, and in the imaging status the camera lens has a narrow angle 2ω≤50° and good optical properties, while in the retraction status, TTL/IH≤1.40, and a small height in the retraction status is obtained.

The camera lens LA1 of the present invention will be described with reference to the embodiments below. The reference signs described in the embodiments are listed below. In addition, the distance, radius and center thickness are all in a unit of mm.

f: focal length of the camera lens;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
Fno: F number;
2ω: full field of view;
STOP: aperture;
R: curvature radius of an optical surface, or a central curvature radius for a lens;
R1: curvature radius of the object side surface S1 of the first lens L1;
R2: curvature radius of the image side surface S2 of the first lens L1;
R3: curvature radius of the object side surface S3 of the second lens L2;
R4: curvature radius of the image side surface S4 of the second lens L2;
R5: curvature radius of an object side surface S5 of the third lens L3;
R6: curvature radius of the image side surface S6 of the third lens L3;
R7: curvature radius of the object side surface S7 of the fourth lens L4;
R8: curvature radius of the image side surface S8 of the fourth lens L4;
R9: curvature radius of the object side surface S9 of the fifth lens L5;
R10: curvature radius of an image side surface S10 of the fifth lens L5;
R11: curvature radius of an object side surface S11 of the sixth lens L6;
R12: curvature radius of an image side surface S12 of the sixth lens L6;
R13: curvature radius of an object side surface S13 of the glass plate GF;
R14: curvature radius of an image side surface S14 of the glass plate GF;
d: center thickness or distance between lenses;
d0: on-axis distance from the aperture STOP to the object side surface S1 of the first lens L1;
d1: center thickness of the first lens L1;
d2: on-axis distance from the image side surface S2 of the first lens L1 to the object side surface S3 of the second lens L2;
d3: center thickness of the second lens L2;
d4: on-axis distance from the image side surface S4 of the second lens L2 to the object side surface S5 of the third lens L3;
d5: center thickness of the third lens L3;
d6: on-axis distance from the image side surface S6 of the third lens L3 to the object side surface S7 of the fourth lens L4;
d7: center thickness of the fourth lens L4;
d8: on-axis distance from the image side surface S8 of the fourth lens L4 to the object side surface S9 of the fifth lens L5;
d9: center thickness of the fifth lens L5;
d10: on-axis distance from the image side surface S10 of the fifth lens L5 to the object side surface S11 of the sixth lens L6;
d11: center thickness of the sixth lens L6;
d12: on-axis distance from the image side surface S12 of the sixth lens L6 to the object side surface S13 of the glass plate GF;
d13: center thickness of the glass plate GF;
d14: on-axis distance from the image side S14 surface S14 of the glass plate GF to the image surface;
D12: on-axis distance from the object side surface S1 of the first lens L1 to the image side surface S4 of the second lens L2;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the glass plate GF;
v: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the glass plate GF;
TTL: on-axis distance from the object side surface of the first lens to an image surface of the camera lens along the optical axis;
LB: back focal length of the camera lens (on-axis distance from the image side surface S12 of the sixth lens L6 to the image surface); and
IH: image height.

Embodiment 1

FIG. 1 is a schematic diagram of a camera lens LA1 according to Embodiment 1 of the present invention. Central curvature radiuses R of the image side surfaces and object side surfaces of the first lens L1 to the sixth lens L6 of the camera lens LA1 according to the Embodiment 1, the center thicknesses of the lenses, or distances d between the lenses, refractive indexes nd, abbe numbers vd are shown in Table 1; values of A are shown in Table 2; conic coefficients k and aspheric coefficients are shown in Table 3; and 2ω, Fno, f, f1, f2, f3, f4, f5, f6, TTL, and IH are shown in Table 4.

TABLE 1

|  | R | d |  | nd |  | vd | Effective radius (mm) |
|---|---|---|---|---|---|---|---|
| Stop |  | d0= | −1.049 |  |  |  | 2.392 |
| S1 | R1 | 3.00057 | d1= | 1.281 | nd1 | 1.5444 | v1 | 55.82 | 2.392 |
| S2 | R2 | 6.41920 | d2= | 0.244 |  |  |  | 2.262 |
| S3 | R3 | 2.71917 | d3= | 0.547 | nd2 | 1.5444 | v2 | 55.82 | 2.063 |
| S4 | R4 | 3.80126 | d4= | 0.154 |  |  |  | 1.940 |
| S5 | R5 | −35.34827 | d5= | 0.387 | nd3 | 1.6700 | v3 | 19.39 | 1.851 |
| S6 | R6 | 6.33850 | d6= | 0.863 |  |  |  | 1.540 |
| S7 | R7 | −6.37036 | d7= | 0.380 | nd4 | 1.6152 | v4 | 25.94 | 1.530 |
| S8 | R8 | −7.30615 | d8= | 1.093 |  |  |  | 1.710 |
| S9 | R9 | −10.37427 | d9= | 0.578 | nd5 | 1.6700 | v5 | 19.39 | 2.576 |
| S10 | R10 | −7.20681 | d10= | 0.065 |  |  |  | 2.648 |
| S11 | R11 | 3.43794 | d11= | 0.400 | nd6 | 1.5346 | v6 | 55.69 | 2.730 |
| S12 | R12 | 2.94337 | d12= | 0.300 |  |  |  | 2.805 |
| S13 | R13 | ∞ | d13= | 0.210 | ndg | 1.5168 | vg | 64.20 | 2.958 |
| S14 | R14 | ∞ | d14= | A |  |  |  | 3.023 |

Reference wavelength = 588 nm

TABLE 2

|  | In an imaging status | In a retraction status |
|---|---|---|
| A | 4.503 | 0.500 |

TABLE 3

| | Cone coefficient | Aspheric surface coefficients | | | | |
|---|---|---|---|---|---|---|
| | k | A4 | A6 | A8 | A10 | A12 |
| S1 | 0.0000E+00 | −8.7968E−04 | −6.7414E−05 | 1.1586E−04 | −1.5632E−04 | 8.1373E−05 |
| S2 | 0.0000E+00 | −2.0046E−02 | 4.9064E−03 | −3.8894E−04 | −2.8618E−04 | 1.9120E−04 |
| S3 | 0.0000E+00 | −2.7988E−02 | −2.4277E−03 | 8.8371E−04 | −2.0725E−04 | 6.6227E−04 |
| S4 | 0.0000E+00 | 3.9896E−03 | −1.5907E−02 | −8.0471E−03 | 1.9940E−02 | −1.4817E−02 |
| S5 | 0.0000E+00 | 5.7479E−02 | −3.2632E−02 | 1.9141E−02 | −6.9656E−03 | 1.0258E−03 |
| S6 | 0.0000E+00 | 4.8209E−02 | 8.9538E−03 | −7.9574E−02 | 1.6469E−01 | −1.8272E−01 |
| S7 | 0.0000E+00 | −3.8287E−02 | 2.9607E−02 | −6.9241E−02 | 1.0979E−01 | −1.0582E−01 |
| S8 | 0.0000E+00 | −2.9688E−02 | 1.5659E−02 | −2.1455E−02 | 2.7451E−02 | −2.0090E−02 |
| S9 | 0.0000E+00 | 2.2950E−02 | −2.0228E−02 | 1.2716E−02 | −4.5853E−03 | 1.0832E−03 |
| S10 | 0.0000E+00 | 2.8531E−03 | −4.9143E−03 | 3.8010E−03 | −9.0828E−04 | 5.6753E−05 |
| S11 | 0.0000E+00 | −9.6321E−02 | 2.7979E−02 | −6.9829E−03 | 1.7376E−03 | −4.1511E−04 |
| S12 | 0.0000E+00 | −8.6898E−02 | 2.5627E−02 | −7.9282E−03 | 2.1538E−03 | −4.7740E−04 |

| | Cone coefficient | Aspheric surface coefficients | | | |
|---|---|---|---|---|---|
| | k | A14 | A16 | A18 | A20 |
| S1 | 0.0000E+00 | −2.4740E−05 | 4.5012E−06 | −4.6053E−07 | 2.0057E−08 |
| S2 | 0.0000E+00 | −6.3953E−05 | 1.2042E−05 | −1.1995E−06 | 4.9763E−08 |
| S3 | 0.0000E+00 | −4.9393E−04 | 1.5212E−04 | −2.1802E−05 | 1.2117E−06 |
| S4 | 0.0000E+00 | 5.8444E−03 | −1.3036E−03 | 1.5511E−04 | −7.6476E−06 |
| S5 | 0.0000E+00 | 7.8401E−05 | −7.6099E−06 | −1.2613E−05 | 2.0128E−06 |
| S6 | 0.0000E+00 | 1.2054E−01 | −4.7097E−02 | 1.0090E−02 | −9.1565E−04 |
| S7 | 0.0000E+00 | 6.4761E−02 | −2.4525E−02 | 5.2407E−03 | −4.8472E−04 |
| S8 | 0.0000E+00 | 9.1424E−03 | −2.5480E−03 | 3.9535E−04 | −2.6309E−05 |
| S9 | 0.0000E+00 | −1.7165E−04 | 1.7532E−05 | −1.0436E−06 | 2.7565E−08 |
| S10 | 0.0000E+00 | 1.8880E−05 | −4.8549E−06 | 4.5246E−07 | −1.5518E−08 |
| S11 | 0.0000E+00 | 7.7155E−05 | −9.2445E−06 | 6.1713E−07 | −1.7354E−08 |
| S12 | 0.0000E+00 | 7.7370E−05 | −8.3146E−06 | 5.2322E−07 | −1.4554E−08 |

Herein, K is a conic coefficient, A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (9)$$

Herein, x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

For convenience, an aspheric surface of each lens surface adopts the aspheric surfaces shown in the condition (9). However, the present invention is not limited to the aspherical polynomials form shown in the condition (9).

TABLE 4

| 2ω (°) | 47.24 |
|---|---|
| Fno | 2.40 |
| f (mm) | 11.500 |

TABLE 4-continued

| | |
|---|---|
| f1 (mm) | 9.143 |
| f2 (mm) | 14.893 |
| f3 (mm) | −7.993 |
| f4 (mm) | −95.634 |
| f5 (mm) | 32.829 |
| f6 (mm) | −53.288 |
| TTL (mm) in the imaging status | 11.004 |
| TTL (mm) in the retraction status | 7.001 |
| IH (mm) | 5.120 |
| TTL/IH in the imaging status | 2.149 |
| TTL/IH in the retraction status | 1.367 |

The following Table 13 shows corresponding values of the parameters defined in the conditions (1) to (8) of Embodiments 1-3.

As shown in Table 13, Embodiment 1 satisfies the conditions (1) to (8).

Figure 2:
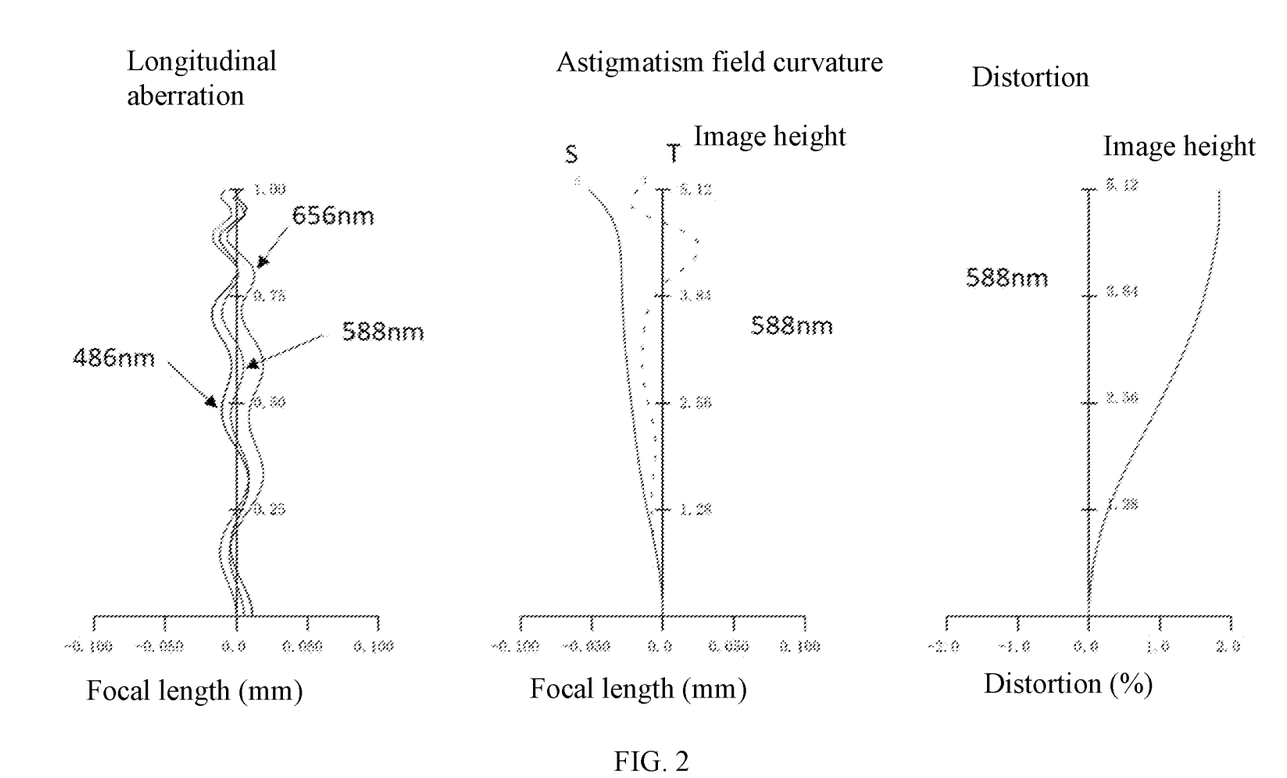
FIG. 2 is a schematic diagram of a longitudinal aberration, an astigmatism field curvature and a distortion of the camera lens shown in FIG. 1.

FIG. 2 illustrates a spherical aberration, an astigmatism field curvature, and a distortion of the camera lens LA1 according to Embodiment 1. In addition, in FIG. 2, S is a field curvature for a sagittal image plane, and T is a field curvature for a meridional image surface, which are the same for Embodiments 2-3. As shown in FIG. 2, the camera lens LA1 according to Embodiment 1 has a narrow angle of 2ω=47.24°, and a small height in the retraction status, i.e., TTL/IH=1.367, and good optical properties.

Embodiment 2

Figure 3:
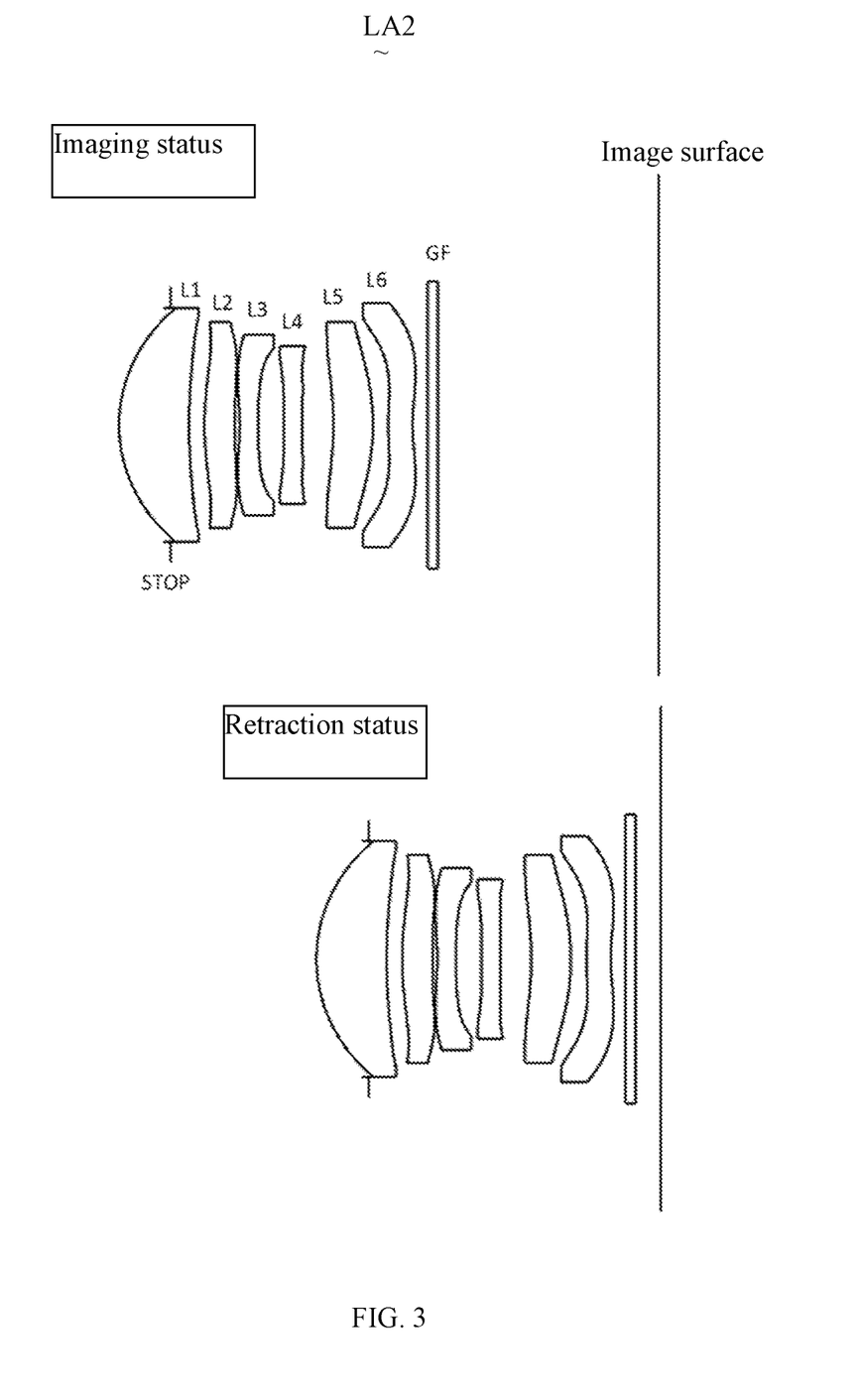
FIG. 3 is a schematic diagram of a general structure of a camera lens in accordance with Embodiment 2 of the present invention.

FIG. 3 is a schematic diagram of a camera lens LA2 according to Embodiment 2 of the present invention, which illustrates the configurations of the camera lens LA2 in an imaging status and a retraction status separately. Central curvature radiuses R of an image side surfaces and object side surfaces of a first lens L1 to a sixth lens L6 of the camera lens LA2 according to the Embodiment 2, center thicknesses of the lenses, or distances d between the lenses, refractive indexes nd, abbe numbers vd are shown in Table 5; values of A are shown in Table 6; conic coefficients k and aspheric coefficients are shown in Table 7; and 2ω, Fno, f, f1, f2, f3, f4, f5, f6, TTL, and IH are shown in Table 8.

TABLE 5

| | | R | d | | nd | | vd | Effective radius (mm) |
|---|---|---|---|---|---|---|---|---|
| Stop | | ∞ | d0= | −1.058 | | | | 2.392 |
| S1 | R1 | 2.96246 | d1= | 1.427 | nd1 | 1.5444 | v1 | 55.82 | 2.392 |
| S2 | R2 | 11.29096 | d2= | 0.315 | | | | | 2.210 |
| S3 | R3 | 6.33003 | d3= | 0.622 | nd2 | 1.5444 | v2 | 55.82 | 2.115 |
| S4 | R4 | −52.10764 | d4= | 0.095 | | | | | 2.023 |
| S5 | R5 | −3.94410 | d5= | 0.380 | nd3 | 1.6700 | v3 | 19.39 | 1.850 |
| S6 | R6 | 299.41035 | d6= | 0.518 | | | | | 1.560 |
| S7 | R7 | −843.40947 | d7= | 0.380 | nd4 | 1.6152 | v4 | 25.94 | 1.530 |
| S8 | R8 | 32.21170 | d8= | 0.633 | | | | | 1.625 |
| S9 | R9 | −5.76281 | d9= | 0.805 | nd5 | 1.6700 | v5 | 19.39 | 1.879 |
| S10 | R10 | −4.81164 | d10= | 0.313 | | | | | 2.109 |
| S11 | R11 | 5.41390 | d11= | 0.496 | nd6 | 1.5346 | v6 | 55.69 | 2.200 |
| S12 | R12 | 3.80138 | d12= | 0.300 | | | | | 2.500 |
| S13 | R13 | ∞ | d13= | 0.210 | ndg | 1.5168 | vg | 64.20 | 2.894 |
| S14 | R14 | ∞ | d14= | A | | | | | 2.959 |

Reference wavelength = 588 nm

TABLE 6

| | In an imaging status | In a retraction status |
|---|---|---|
| A | 4.502 | 0.500 |

TABLE 7

| | Cone coefficient | Aspheric surface coefficients | | | | |
|---|---|---|---|---|---|---|
| | k | A4 | A6 | A8 | A10 | A12 |
| S1 | 0.0000E+00 | −1.2564E−03 | 1.4860E−04 | 7.8882E−05 | −1.5443E−04 | 8.2296E−05 |
| S2 | 0.0000E+00 | −5.8656E−03 | 2.5956E−03 | −5.1063E−04 | −2.5213E−04 | 1.9996E−04 |
| S3 | 0.0000E+00 | −1.0451E−02 | 1.8705E−03 | −1.8021E−03 | 1.3957E−03 | −1.2106E−03 |
| S4 | 0.0000E+00 | 9.3010E−02 | −7.8257E−02 | 1.5044E−02 | 1.4922E−02 | −1.2922E−02 |
| S5 | 0.0000E+00 | 2.0890E−01 | −2.2602E−01 | 1.8158E−01 | −1.0534E−01 | 4.5680E−02 |
| S6 | 0.0000E+00 | 1.2770E−01 | −1.6279E−01 | 1.5464E−01 | −9.6115E−02 | 4.4584E−02 |
| S7 | 0.0000E+00 | −1.5700E−03 | −8.2900E−02 | 1.0926E−01 | −1.0385E−01 | 8.2030E−02 |
| S8 | 0.0000E+00 | 6.0184E−03 | −5.4665E−02 | 6.5400E−02 | −4.9242E−02 | 3.1362E−02 |
| S9 | 0.0000E+00 | 2.7833E−02 | −1.0637E−02 | −2.3513E−03 | 8.8507E−03 | −6.7204E−03 |
| S10 | 0.0000E+00 | −1.7052E−02 | 3.1956E−02 | −3.0883E−02 | 2.0491E−02 | −9.0806E−03 |
| S11 | 0.0000E+00 | −1.3023E−01 | 6.6899E−02 | −3.8910E−02 | 1.9554E−02 | −7.4126E−03 |
| S12 | 0.0000E+00 | −1.0378E−01 | 4.3570E−02 | −1.9646E−02 | 7.3585E−03 | −2.0672E−03 |

TABLE 7-continued

|  | Cone coefficient | Aspheric surface coefficients | | | |
| --- | --- | --- | --- | --- | --- |
|  | k | A14 | A16 | A18 | A20 |
| S1 | 0.0000E+00 | −2.4782E−05 | 4.4771E−06 | −4.6052E−07 | 2.1040E−08 |
| S2 | 0.0000E+00 | −6.3625E−05 | 1.1788E−05 | −1.2518E−06 | 6.1137E−08 |
| S3 | 0.0000E+00 | 5.7138E−04 | −1.3946E−04 | 1.7182E−05 | −8.5357E−07 |
| S4 | 0.0000E+00 | 4.7696E−03 | −9.6612E−04 | 1.0474E−04 | −4.7744E−06 |
| S5 | 0.0000E+00 | −1.4242E−02 | 2.9238E−03 | −3.4636E−04 | 1.7750E−05 |
| S6 | 0.0000E+00 | −1.6439E−02 | 4.9910E−03 | −1.0858E−03 | 1.1510E−04 |
| S7 | 0.0000E+00 | −4.5358E−02 | 1.5768E−02 | −3.0951E−03 | 2.6325E−04 |
| S8 | 0.0000E+00 | −1.4666E−02 | 4.3872E−03 | −7.4685E−04 | 5.5430E−05 |
| S9 | 0.0000E+00 | 2.7853E−03 | −6.8905E−04 | 9.5461E−05 | −5.7213E−06 |
| S10 | 0.0000E+00 | 2.6494E−03 | −4.8957E−04 | 5.2086E−05 | −2.4371E−06 |
| S11 | 0.0000E+00 | 1.9579E−03 | −3.3725E−04 | 3.4164E−05 | −1.5395E−06 |
| S12 | 0.0000E+00 | 4.0226E−04 | −5.0405E−05 | 3.6319E−06 | −1.1349E−07 |

TABLE 8

| 2ω (°) | 47.21 |
| --- | --- |
| Fno | 2.40 |
| f (mm) | 11.500 |
| f1 (mm) | 6.958 |
| f2 (mm) | 10.408 |
| f3 (mm) | −5.808 |
| f4 (mm) | −50.423 |
| f5 (mm) | 32.487 |
| f6 (mm) | −26.737 |
| TTL (mm) in the imaging status | 10.994 |
| TTL (mm) in the imaging status | 6.992 |
| IH (mm) | 5.120 |
| TTL/IH in the imaging status | 2.147 |
| TTL/IH in the imaging status | 1.366 |

As shown in Table 13, Embodiment 2 satisfies the conditions (1) to (8).

Figure 4:
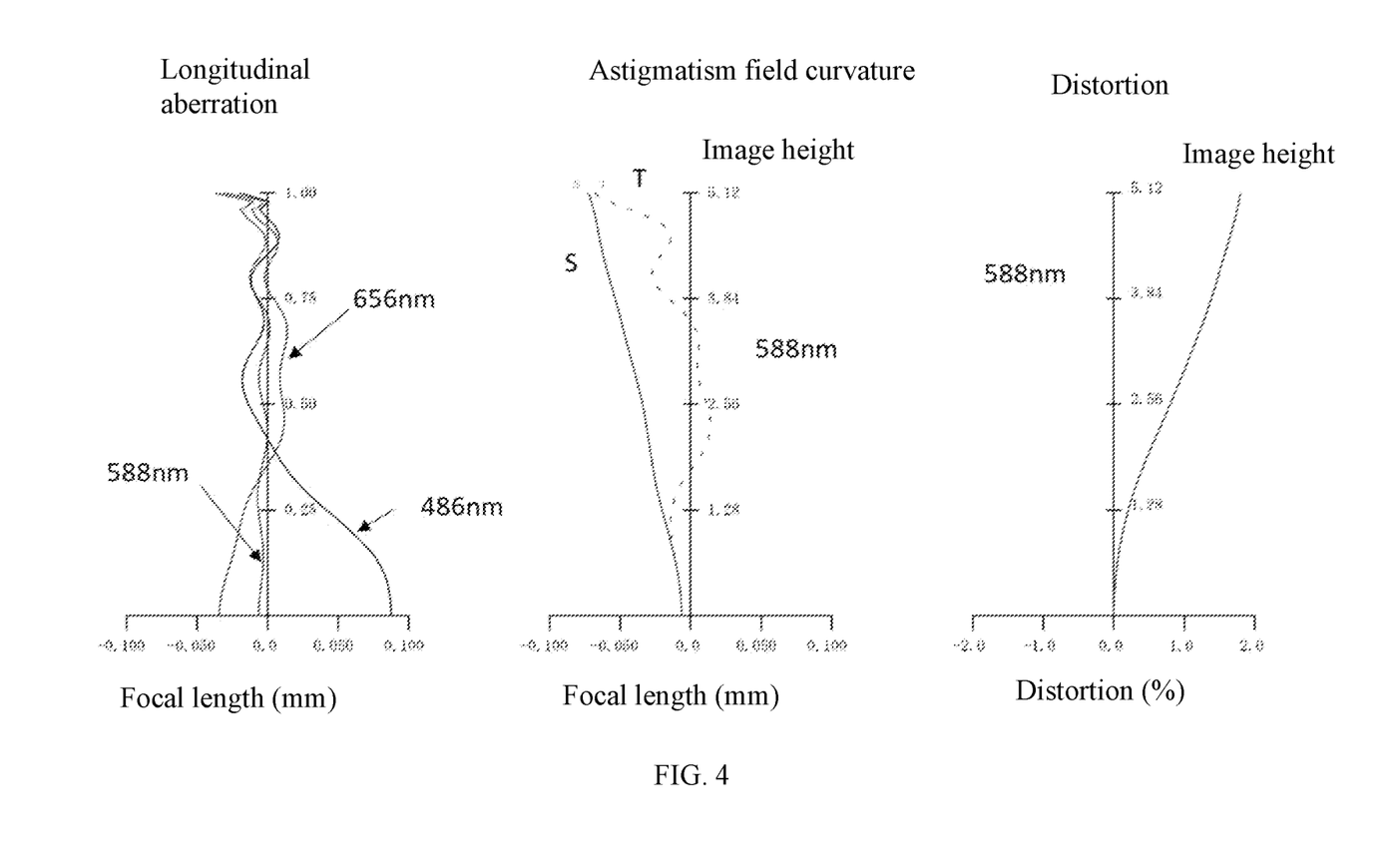
FIG. 4 is a schematic diagram of a longitudinal aberration, an astigmatism field curvature and a distortion of the camera lens shown in FIG. 1.

FIG. 4 illustrates a spherical aberration, an astigmatism field curvature, and a distortion of the camera lens LA2 according to Embodiment 2. As shown in FIG. 4, The camera lens LA2 according to Embodiment 2 has a narrow angle of 2ω=47.21°, and a small height in the retraction status, i.e., TTL/IH=1.366, and good optical properties.

Embodiment 3

Figure 5:
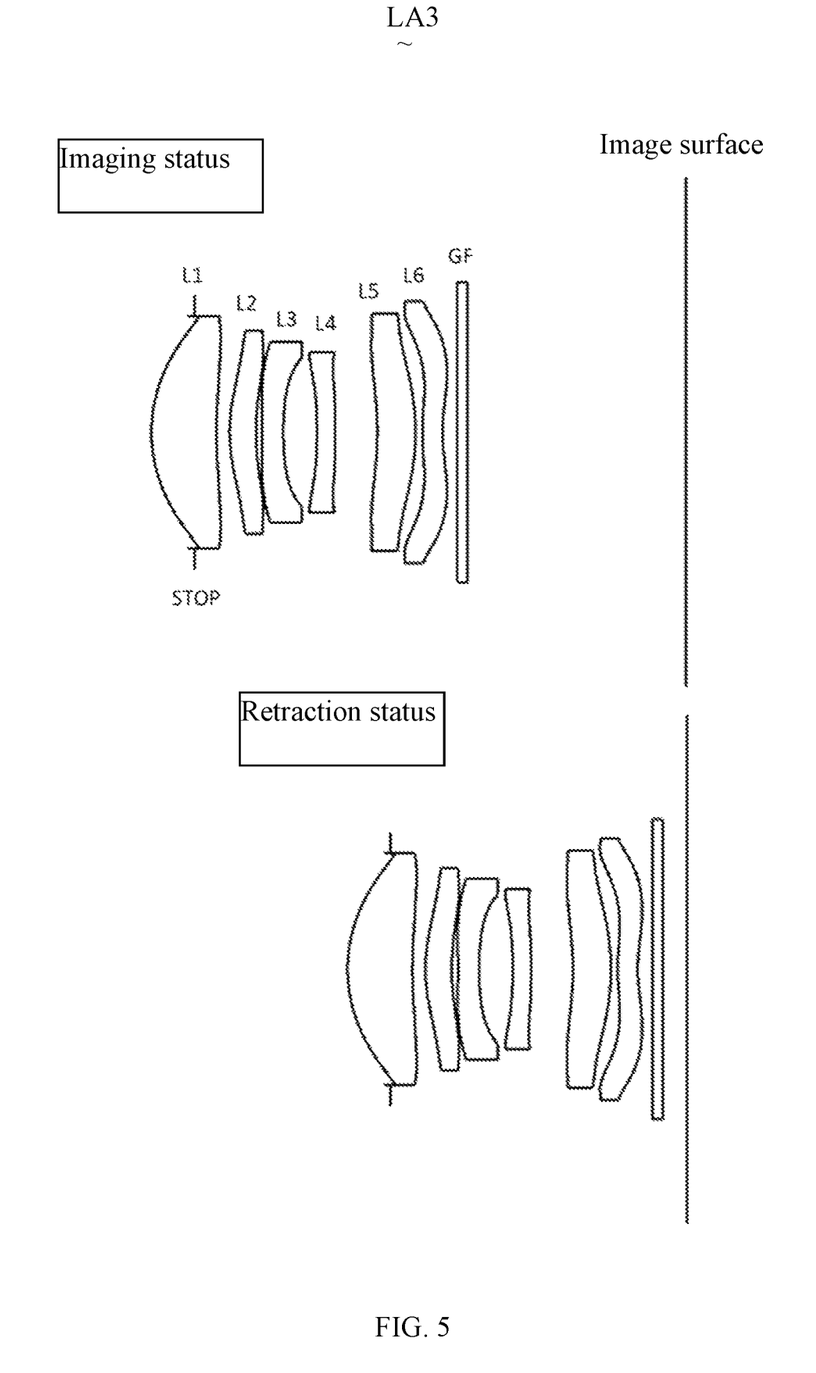
FIG. 5 is a schematic diagram of a general structure of a camera lens in accordance with Embodiment 3 of the present invention.

FIG. 5 is a schematic diagram of a camera lens LA3 according to Embodiment 3 of the present invention, which illustrates the configurations of the camera lens LA3 in an imaging status and a retraction status separately. Central curvature radiuses R of an image side surfaces and object side surfaces of a first lens L1 to a sixth lens L6 of the camera lens LA3 according to the Embodiment 2, center thicknesses of the lenses, or distances d between the lenses, refractive indexes nd, abbe numbers vd are shown in Table 9; values of A are shown in Table 10; conic coefficients k and aspheric coefficients are shown in Table 11; and 2ω, Fno, f, f1, f2, f3, f4, f5, f6, TTL, and IH are shown in Table 12.

TABLE 9

|  |  | R | d |  | nd |  | vd | Effective radius (mm) |
| --- | --- | --- | --- | --- | --- | --- | --- | --- |
| Stop |  | ∞ | d0= | −0.882 |  |  |  | 2.392 |
| S1 | R1 | 3.03814 | d1= | 1.336 | nd1 | 1.5444 | v1 | 55.82 | 2.392 |
| S2 | R2 | 8.37041 | d2= | 0.269 |  |  |  | 2.308 |
| S3 | R3 | 3.18555 | d3= | 0.545 | nd2 | 1.5661 | v2 | 37.71 | 2.089 |
| S4 | R4 | 5.38347 | d4= | 0.129 |  |  |  | 1.975 |
| S5 | R5 | −11.15141 | d5= | 0.435 | nd3 | 1.6700 | v3 | 19.39 | 1.862 |
| S6 | R6 | 8.01983 | d6= | 0.690 |  |  |  | 1.540 |
| S7 | R7 | −11.88123 | d7= | 0.380 | nd4 | 1.6399 | v4 | 23.54 | 1.530 |
| S8 | R8 | −18.72758 | d8= | 0.863 |  |  |  | 1.655 |
| S9 | R9 | −5.99915 | d9= | 0.785 | nd5 | 1.6700 | v5 | 19.39 | 2.200 |
| S10 | R10 | −4.74708 | d10= | 0.139 |  |  |  | 2.449 |
| S11 | R11 | 4.03972 | d11= | 0.414 | nd6 | 1.5346 | v6 | 55.69 | 2.565 |
| S12 | R12 | 3.14775 | d12= | 0.300 |  |  |  | 2.697 |
| S13 | R13 | ∞ | d13= | 0.210 | ndg | 1.5168 | vg | 64.20 | 3.026 |
| S14 | R14 | ∞ | d14= | A |  |  |  | 3.088 |

Reference wavelength = 588 nm

TABLE 10

|   | In an imaging status | In a retraction status |
|---|---|---|
| A | 4.498 | 0.500 |

TABLE 11

| | Cone coefficient | Aspheric surface coefficients | | | | |
|---|---|---|---|---|---|---|
| | k | A4 | A6 | A8 | A10 | A12 |
| S1 | 0.0000E+00 | −1.1453E−03 | −2.1711E−04 | 1.1116E−04 | −1.5823E−04 | 8.0853E−05 |
| S2 | 0.0000E+00 | −2.0319E−02 | 4.7354E−03 | −4.0834E−04 | −2.8639E−04 | 1.9127E−04 |
| S3 | 0.0000E+00 | −3.1124E−02 | 6.7068E−04 | −1.6208E−03 | 1.7075E−03 | −3.3870E−04 |
| S4 | 0.0000E+00 | 4.0008E−03 | −1.6013E−02 | 1.0435E−02 | −7.5745E−03 | 3.7198E−03 |
| S5 | 0.0000E+00 | 6.7242E−02 | −3.6883E−02 | 2.8340E−02 | −2.0147E−02 | 1.0033E−02 |
| S6 | 0.0000E+00 | 5.5030E−02 | −3.0334E−02 | 2.7157E−02 | −1.9348E−02 | 1.0801E−02 |
| S7 | 0.0000E+00 | −2.6915E−02 | 6.4240E−03 | −1.2787E−02 | 2.3255E−02 | −1.8378E−02 |
| S8 | 0.0000E+00 | −1.4142E−02 | 7.5534E−03 | −1.0359E−02 | 1.9155E−02 | −1.5833E−02 |
| S9 | 0.0000E+00 | 2.7125E−02 | −1.5905E−02 | 9.7226E−03 | −3.6356E−03 | 8.9645E−04 |
| S10 | 0.0000E+00 | −8.4510E−03 | 2.1906E−02 | −1.9033E−02 | 1.0661E−02 | −3.7911E−03 |
| S11 | 0.0000E+00 | −1.2413E−01 | 6.1969E−02 | −3.2160E−02 | 1.3224E−02 | −3.8223E−03 |
| S12 | 0.0000E+00 | −1.0664E−01 | 4.1865E−02 | −1.7389E−02 | 5.8221E−03 | −1.4383E−03 |

| | Cone coefficient | Aspheric surface coefficient | | | |
|---|---|---|---|---|---|
| | k | A14 | A16 | A18 | A20 |
| S1 | 0.0000E+00 | −2.4809E−05 | 4.4975E−06 | −4.6045E−07 | 1.9951E−08 |
| S2 | 0.0000E+00 | −6.3946E−05 | 1.2040E−05 | −1.2004E−06 | 4.9464E−08 |
| S3 | 0.0000E+00 | −1.4031E−04 | 7.5995E−05 | −1.2920E−05 | 7.8063E−07 |
| S4 | 0.0000E+00 | −1.0917E−03 | 1.9136E−04 | −1.9121E−05 | 8.6682E−07 |
| S5 | 0.0000E+00 | −3.2681E−03 | 6.7799E−04 | −8.2988E−05 | 4.6054E−06 |
| S6 | 0.0000E+00 | −3.9136E−03 | 9.0937E−04 | −1.3470E−04 | 1.0830E−05 |
| S7 | 0.0000E+00 | 8.4657E−03 | −2.3441E−03 | 3.5366E−04 | −2.1418E−05 |
| S8 | 0.0000E+00 | 7.7843E−03 | −2.3607E−03 | 4.0241E−04 | −2.9280E−05 |
| S9 | 0.0000E+00 | −1.4702E−04 | 1.5127E−05 | −9.1338E−07 | 2.7694E−08 |
| S10 | 0.0000E+00 | 8.5770E−04 | −1.1926E−04 | 9.2411E−06 | −3.0410E−07 |
| S11 | 0.0000E+00 | 7.3204E−04 | −8.7398E−05 | 5.8783E−06 | −1.7027E−07 |
| S12 | 0.0000E+00 | 2.4442E−04 | −2.6702E−05 | 1.6763E−06 | −4.5485E−08 |

TABLE 12

| | |
|---|---|
| 2ω (°) | 47.24 |
| Fno | 2.40 |
| f (mm) | 11.500 |
| f1 (mm) | 8.050 |
| f2 (mm) | 12.650 |
| f3 (mm) | −6.900 |
| f4 (mm) | −51.910 |
| f5 (mm) | 27.123 |
| f6 (mm) | −31.808 |
| TTL (mm) in the imaging status | 10.992 |
| TTL (mm) in the retraction status | 6.994 |
| IH (mm) | 5.120 |
| TTL/IH in the imaging status | 2.147 |
| TTL/IH in the retraction status | 1.366 |

As shown in Table 13, Embodiment 3 satisfies the conditions (1) to (8).

Figure 6:
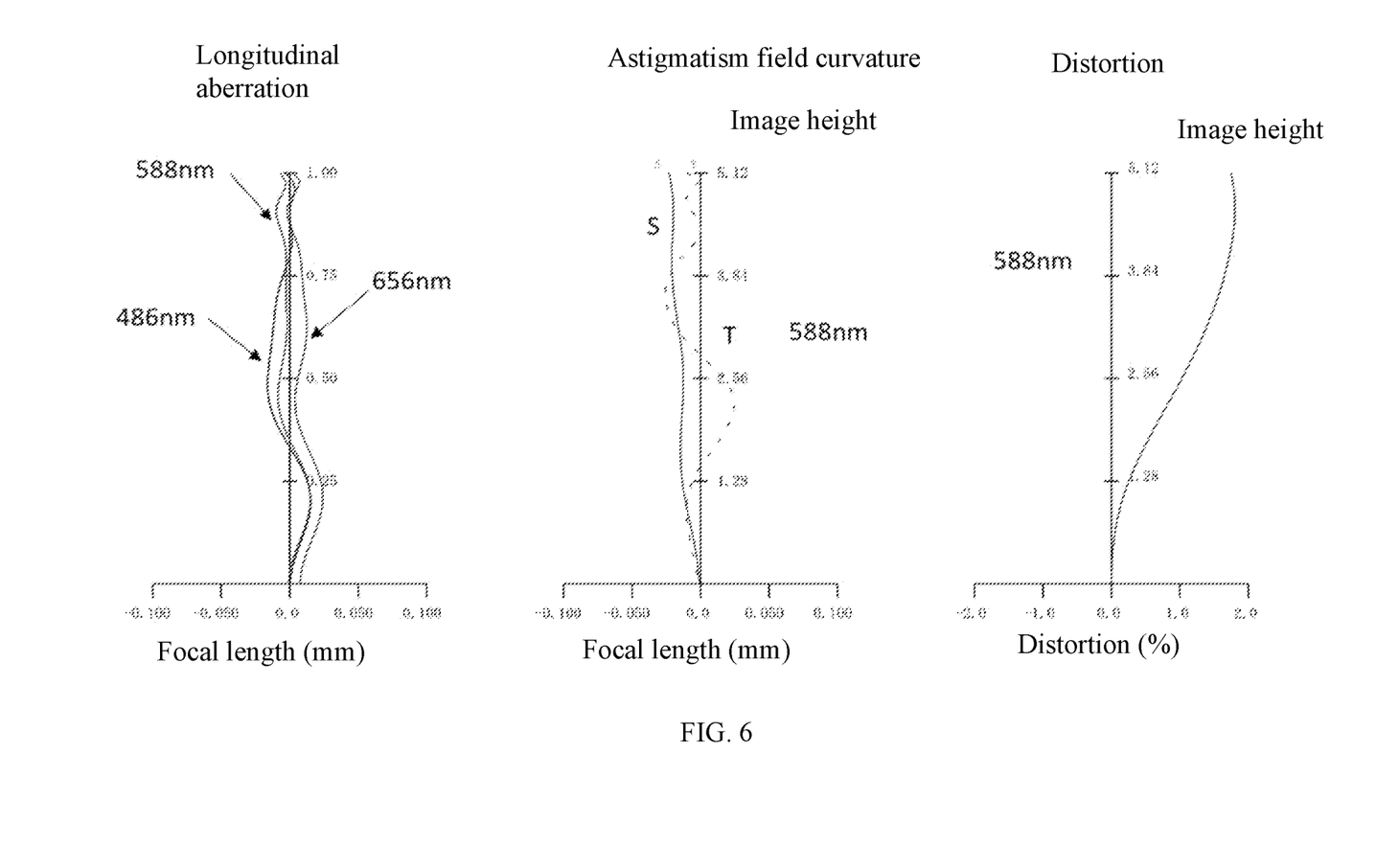
FIG. 6 is a schematic diagram of a longitudinal aberration, an astigmatism field curvature and a distortion of the camera lens shown in FIG. 5.

FIG. 6 illustrates a spherical aberration, an astigmatism field curvature, and a distortion of the camera lens LA3 according to Embodiment 3. As shown in FIG. 6, The camera lens LA3 according to Embodiment 3 has a narrow angle of 2ω=47.24°, and a small height in the retraction status, i.e., TTL/IH=1.366, and good optical properties.

The Table 13 shows the corresponding values of the parameters defined in the conditions (1) to (8) of Embodiments 1-3.

TABLE 13

| | Embodiment 1 | Embodiment 2 | Embodiment 3 | Notes |
|---|---|---|---|---|
| Imaging status (TTL/LB) | 2.195 | 2.193 | 2.195 | Condition (1) |
| D12/d2 | 8.495 | 7.505 | 8.000 | Condition (2) |
| d6/f | 0.075 | 0.045 | 0.060 | Condition (3) |
| R6/R7 | −0.995 | −0.355 | −0.675 | Condition (4) |
| f1/f | 0.795 | 0.605 | 0.700 | Condition (5) |
| f2/f | 1.295 | 0.905 | 1.100 | Condition (6) |
| f3/f | −0.695 | −0.505 | −0.600 | Condition (7) |
| d8/f | 0.095 | 0.055 | 0.075 | Condition (8) |

What is claimed is:

1. A camera lens with six-piece lenses, comprising, from an object side to an image side in sequence: a first lens having a positive refractive power, a second lens having a positive refractive power, a third lens having a negative refractive power, a fourth lens having a negative refractive power, a fifth lens having a positive refractive power, and a sixth lens having a negative refractive power, and the camera lens satisfies following conditions:

in an imaging status, $TTL/LB \leq 2.20$;

$7.50 \leq D12/d2 \leq 8.50$;

$0.60 \leq f1/f \leq 0.80$;

$0.04 \leq d6/f \leq 0.08$; and $-1.00 \leq R6/R7 \leq -0.35$, where TTL denotes an on-axis distance from an object side surface of the first lens to an image surface of the camera lens along an optical axis, LB denotes a back focal length of the camera lens, D12 denotes an on-axis distance from the object side surface of the first lens to an image side surface of the second lens, d2 denotes an on-axis distance from an image side surface of the first lens to an object side surface of the second lens, f1 denotes a focal length of the first lens, f denotes a focal length of the camera lens, d6 denotes an on-axis distance from an image side surface of the third lens to an object side surface of the fourth lens, R6 denotes a central curvature radius of the image side surface of the third lens, and R7 denotes a central curvature radius of the object side surface of the fourth lens.

2. The camera lens according to claim 1, wherein, the camera lens further satisfies a following condition:

$0.90 \leq f2/f \leq 1.30$, where f2 denotes a focal length of the second lens.

3. The camera lens according to claim 1, wherein, the camera lens further satisfies a following condition:

$-0.70 \leq f3/f \leq -0.50$, where f3 denotes a focal length of the third lens.

4. The camera lens according to claim 1, wherein, the camera lens further satisfies a following condition:

$0.05 \leq d8/f \leq 0.10$, where d8 denotes an on-axis distance from an image side surface of the fourth lens to an object side surface of the fifth lens.

* * * * *